US008338526B2

(12) United States Patent
Kanai et al.

(10) Patent No.: US 8,338,526 B2
(45) Date of Patent: Dec. 25, 2012

(54) CURABLE RESIN COMPOSITION, SURFACE PROTECTION METHOD, TEMPORARY FIXATION METHOD, AND SEPARATION METHOD

(75) Inventors: Tomoyuki Kanai, Shibukawa (JP); Kazuhiro Oshima, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/181,031

(22) Filed: Jul. 12, 2011

(65) Prior Publication Data
US 2011/0269868 A1 Nov. 3, 2011

Related U.S. Application Data

(62) Division of application No. 12/159,231, filed as application No. PCT/JP2007/050273 on Jan. 11, 2007.

(30) Foreign Application Priority Data

Jan. 13, 2006 (JP) ................................ 2006-005597
Sep. 14, 2006 (JP) ................................ 2006-248859
Oct. 16, 2006 (JP) ................................ 2006-281257

(51) Int. Cl.
*C08L 31/00* (2006.01)
*C08F 290/06* (2006.01)
*C08F 279/02* (2006.01)
*C08F 265/04* (2006.01)

(52) U.S. Cl. ........ 524/556; 525/126; 525/303; 525/304; 525/308; 525/310; 522/120; 522/92; 522/121

(58) Field of Classification Search .................. 524/556; 525/308, 126, 303, 304, 310; 522/120, 83, 522/92, 121; 156/247
See application file for complete search history.

(56) References Cited

U.S. PATENT DOCUMENTS 6,326,417 B1 * 12/2001 Jia ................................. 523/116
7,988,811 B2    8/2011 Kurimura et al.
2005/0014861 A1 * 1/2005 Qian ............................. 523/116
2008/0149270 A1    6/2008 Oshima et al.
2010/0012263 A1    1/2010 Oshima et al.

FOREIGN PATENT DOCUMENTS

| CN | 1044666 A | * | 8/1990 |
| JP | 09157336 A | * | 6/1997 |
| JP | 2003-128714 | | 5/2003 |
| JP | 2005-504861 | | 2/2005 |
| WO | WO 9747671 A1 | * | 12/1997 |

OTHER PUBLICATIONS

U.S. Appl. No. 13/178,186, filed Jul. 7, 2011, Oshima, et al.
Japanese Office Action in corresponding Japanese Application No. JPA2006-248859, dated Mar. 24, 2012. (w/English Translation).
U.S. Appl. No. 13/436,025, filed Mar. 30, 2012, Kanai, et al.
Japanese Office Action in corresponding Japanese Patent Application No. 2006-005597, dated Apr. 24, 2012 (w/English Translation).

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

To provide an environmentally-friendly curable resin composition for surface protection, having a high adhesive strength and being capable of forming a protective film which will readily be removed in the film form without adhesive residue in water on a member to be processed, a photocurable adhesive using it, a method for temporarily fixing a member, and a method for removing a protective film.

A curable resin composition for surface protection, comprising (A) a polyfunctional (meth)acrylate, (B) a monofunctional (meth)acrylate, and (C) a resin having a cyclopentadiene skeleton. Further, a curable resin composition for surface protection, comprising (A) a polyfunctional (meth)acrylate, (B) a monofunctional (meth)acrylate, (C) a resin having a cyclopentadiene skeleton, and (D) a photopolymerization initiator. Still further, a curable resin composition for surface protection, comprising (A) a polyfunctional (meth)acrylate, (B) a monofunctional (meth)acrylate, (C) a resin having a cyclopentadiene skeleton, (D) a photopolymerization initiator, and (E) a polar organic solvent.

14 Claims, No Drawings

US 8,338,526 B2

CURABLE RESIN COMPOSITION, SURFACE PROTECTION METHOD, TEMPORARY FIXATION METHOD, AND SEPARATION METHOD

This application is a Divisional of U.S. application Ser. No. 12/159,231, filed on Jun. 26, 2008, which is the National Stage of PCT/JP2007/050273 filed on Jan. 11, 2007.

TECHNICAL FIELD

The present invention relates to a surface protective film to protect a member to be processed in processing of various members from e.g. cutting wastes, and a surface protective film (hereinafter sometimes referred to as "protective film") for temporary fixation to protect a portion which should not be painted or printed in painting or printing of a member to be processed with e.g. an ink. Further, it relates to a curable resin composition suitable for such a film and a method for protecting the surface of a member to be processed by using an adhesive comprising the curable resin composition.

More specifically, the present invention relates to a method for removing a protective film covering a member in processing of members, and a photocurable adhesive suitable for such an application. Further, it relates to a method for temporarily fixing a member to be processed, which comprises bonding the member to be processed to a substrate, processing the member to be processed, and immersing the bonded portion in warm water to remove the cured product thereby to recover the member to be processed.

BACKGROUND ART

In processing, particularly precision processing such as cutting, grinding or polishing of metal plates, molds, aluminum sashes, plastic plates, semiconductor wafers, circuit boards, ceramics, optical components such as glass and quartz, and electric and electronic components such as sensors, a surface protective film to temporarily protect components has been widely used so as to prevent damage by cutting water, scars or contamination by e.g. cutting wastes, or breakage, by covering an already processed surface of a member to be processed and a functional portion such as a circuit or a sensor portion. As such a surface protective film, a pressure-sensitive adhesive sheet has been mainly used.

Further, in plating process employed for a circuit board such as a printed-wiring board, a pressure-sensitive adhesive sheet cut into an optional shape, which is a protective material to prevent contamination by a plating liquid, has been used as a masking material to a portion on which plating is not required on a circuit.

Further, in addition to electric and electronic components, painting and various printings are conducted by various printing methods on various industrial products, such as tablets such as nameplates and logos, scales on measuring instruments and decorations. In a case where there is a portion on which painting or printing is not required, a pressure-sensitive adhesive sheet is bonded to that portion and then painting or printing is carried out.

However, in a case where a pressure-sensitive adhesive sheet is used as a protective film when a member to be processed is processed, along with downsizing and miniaturization of components in recent years, the bonding operation is complicated and in addition, even a slight displacement of the bonding position may impair the yield or the design properties of the products. When a component has recesses and protrusions, the sheet cannot follow the recesses and protrusions and is removed during processing, thus contaminating the member to be processed in some cases. In addition, when a pressure-sensitive adhesive sheet which has been cut to be fitted to the shape of the member to be processed is to be used, an expensive mold is required to cut the sheet, such being disadvantageous in view of cost.

In order to solve these problems, separately from a pressure-sensitive adhesive sheet, a masking method has been studied, comprising coating a surface of a member to be processed with an ultraviolet-curable composition capable of being removed by a specific organic solvent or aqueous alkali solution by screen printing, followed by curing with ultraviolet rays for covering (Patent Documents 1 to 3).

However, since the method employs an aqueous alkali solution or an organic solvent, the cleaning process is complicated, and the method is problematic in view of working environment. Further, in a case where the surface of a member to be processed has fine irregularities, the organic solvent cannot sufficiently infiltrate, whereby the protective film cannot completely be removed, thus causing problems in the outer appearance of the member to be processed.

Further, making a semiconductor wafer or an optical component thin (hereinafter sometimes referred to as "grinding") has been carried out by backgrinding wherein a circuit surface of the wafer or the optical component is protected with a surface protective sheet, and the back side opposite to the circuit surface is ground.

At present, the thickness of wafers is usually 150 µm at the industrial level. However, further thinner wafers have been desired. In a case where a wafer is made thinner, a phenomenon such that the ground side (back side) has irregularities by the influence of the recesses and protrusions on the circuit surface, i.e. back transfer of a circuit pattern is remarkable.

The reason why the back transfer occurs is explained as follows. Namely, a pressure-sensitive adhesive surface protective sheet presently used has limited capability to follow recesses and protrusions of a circuit on a semiconductor wafer. Accordingly, a gap (air pocket) is present between the adhesive layer and the circuit surface, and the wafer is not directly supported by the adhesive (protective layer) at that region. When the wafer is made thin by grinding, at the scribe line (street) not supported, the wafer moves in the vertical direction between circuit dies while the air pocket is compressed and resultingly, the wafer is not ground in this region and becomes thicker than the other portion. On the other hand, in a case where there are hard protrusions such as bumps, the wafer is further ground and becomes thinner at such a region than the other portion resultingly.

The above phenomenon is not problematic when the thickness of the finished wafer is 150 µm or more, but when the wafer is thinner than 100 µm (particularly when the wafer is finished to have a thickness of 50 µm or below) or when protrusions on the wafer circuit surface such as bumps are remarkably high (for example, 100 µm or more), not only the deflective strength of the wafer will be remarkably lowered, but in a worse situation, the wafer may be even broken during grinding.

Further, when the wafer is ground to make it thin at a level of 50 µm, the cutout of the edge of the wafer or infiltration of the grinding water into a space between the wafer and the surface protective layer are problematic. This is also due to insufficient adhesion of the surface protective sheet to the edge of the wafer. Further, along with the tendency to make the wafer thin, on a semiconductor wafer which has, on the circuit surface, protrusions of 100 µm or higher represented by bumps, typical grinding itself carried out by bonding a semiconductor surface protective sheet is difficult.

A conventional surface protective sheet is usually a sheet comprising a polymer film material and an adhesive layer as a surface protective layer on the polymer film material. The adhesive is designed to have a low elastic modulus so as to follow the recesses and protrusions on the circuit surface. However, if this tendency is too significant, a great stress will be applied to the wafer when the sheet is removed by peeling from the wafer, thus leading to breakage. Accordingly, a protective sheet which will be easily removed by energy rays has been developed, wherein the adhesive is cured by irradiating with energy rays such as ultraviolet rays before peeling of the sheet to reduce the adhesive force between the wafer and the protective sheet. However, the adhesive layer is too soft if it is uncured at the time of grinding, whereby the wafer may be broken during grinding.

Patent Document 4 discloses a wafer grinding method which comprises bonding the above protective sheet which will be easily removed by energy rays to a wafer on which a circuit is formed, curing the adhesive layer with energy rays, and then carrying out backgrinding of the wafer. However, the adhesive, which is not a fluid, has insufficient capability to follow the recesses and protrusions on the wafer circuit surface.

Further, Patent Document 5 discloses a hot-melt type semiconductor surface protective sheet. A hot-melt type sheet which is melted by heating at from 60 to 100° C. and shows fluidity, follows the recesses and protrusions on the circuit surface and exhibits excellent grinding properties. However, this sheet is repeatedly melted every time the temperature exceeds the melting point.

A semiconductor wafer after bonded to a protective sheet, usually undergoes heating in a step of bonding a film to be used to fix a chip i.e. a die attachment film (hereinafter sometimes referred to as "DAF") or in a step of forming a metal film by sputtering in some cases. Resultingly, such a defect may occur that the protective sheet is re-melted in some cases.

Further, separately from the surface protective film, a method has been studied to protect a member to be processed from e.g. cutting wastes during processing, by coating the surface of a member with an ultraviolet-curable adhesive which is soluble in a specific organic solvent, followed by curing with ultraviolet rays for covering. However, since an organic solvent is used, the cleaning step is complicated, and there is a problem in view of working environment. Further, in the case of fine recesses and protrusions, the organic solvent cannot sufficiently infiltrate to completely remove the protective film, thus causing problems in the outer appearance of the member to be processed.

Patent Document 1: JP-A-59-051962
Patent Document 2: JP-A-01-234477
Patent Document 3: JP-A-03-139573
Patent Document 4: JP-A-11-026406
Patent Document 5: JP-A-2000-038556

DISCLOSURE OF THE INVENTION

Objects to be Accomplished by the Invention

In processing, particularly precision processing such as cutting, grinding or polishing of metal plates, molds, aluminum sashes, plastic plates, semiconductor wafers, circuit boards, ceramics, optical components such as glass and quartz, and electric and electronic components such as sensors, a curable composition suitable for protecting an already processed surface of a member to be processed or a functional portion such as a circuit or a sensor portion, from infiltration of cutting water or from scars or contamination by e.g. cutting wastes, and a removing method excellent in workability from the environmental viewpoint without adhesive residue, in removal of the covering protective film from the member to be processed after processing, have been desired.

Further, in order to improve the dimensional accuracy of a member after cutting, a photocurable adhesive which is hydrophobic, which has high adhesive strength and which is excellent in releasability in water, has been desired. Particularly, in a case where a semiconductor wafer, an optical component or the like is made thin by backgrinding, a photocurable adhesive having the above properties, which protects a circuit surface of a wafer or a surface which should not be processed of an optical component, has been eagerly desired.

Further, a protective film which protects, in processing of the above-exemplified optical components or electric or electronic components such as sensors, such a member or the surface of a member from infiltration of cutting water or from scars or contamination by e.g. cutting wastes, a protective film which prevents contamination by a plating liquid used for a circuit board such as a printed wiring board, and further, a curable resin composition for surface protection with favorable workability, as a temporary protective film suitable for masking at the time of painting or printing of various industrial products such as tablets such as nameplates and logos, scales on measuring instruments and decorations, in addition to electric or electronic components, have been desired.

Means to Accomplish the Objects

The present inventors have conducted studies to achieve the above objects and as a result, made the following findings and accomplished the present invention.

(a) The above objects are achieved by a method wherein a protective film made of a favorable curable resin composition which is a material having sufficient capability to follow the recesses and protrusions of a metal plate, a semiconductor wafer or an optical component, and which has sufficient rigidity as a protective film for processing and has high adhesive strength, is provided on a member to be processed, the member to be processed is processed, a sheet is bonded to the surface of the member to be processed and/or the protective film, and the member to be processed is separated from the protective film and the sheet, or the protective sheet is separated from the member to be processed and the sheet.

(b) The above object is achieved by a curable resin composition comprising a (meth)acrylate monomer and a resin having a cyclopentadiene skeleton as components, which is a material having sufficient capability to follow the recesses and protrusions on a circuit surface of a wafer or an optical component and which is a composition having sufficient rigidity as a support at the time of grinding.

(c) A curable resin composition comprising a specific (meth)acrylate monomer is suitable as a surface protective film for processing of a member to be processed, such a composition having a specific viscosity makes application of screen printing possible, and in addition, when a protective film made of such a curable resin composition is used, a method for protecting the surface of a member to be processed, which is capable of preventing scars or stain during processing of the member to be processed and with which no surface protective film will remain unremoved, can be provided.

The present invention provides the following:
(1) A curable resin composition for surface protection, comprising (A) a polyfunctional (meth)acrylate, (B) a monofunctional (meth)acrylate, and (C) a resin having a cyclopentadiene skeleton.

(2) A curable resin composition for surface protection, comprising (A) a polyfunctional (meth)acrylate, (B) a monofunctional (meth)acrylate, (C) a resin having a cyclopentadiene skeleton, and (D) a photopolymerization initiator.

(3) A curable resin composition for surface protection, comprising (A) a polyfunctional (meth)acrylate, (B) a monofunctional (meth)acrylate, (C) a resin having a cyclopentadiene skeleton, (D) a photopolymerization initiator, and (E) a polar organic solvent.

(4) The curable resin composition for surface protection according to any one of the above (1) to (3), wherein (C) has an ester group or a hydroxyl group in its molecule.

(5) A curable resin composition for surface protection, comprising (F) a (meth)acrylate having at least one (meth)acryloyl group at the terminal or in the side chain of its molecule and having a molecular weight of at least 500, (G) a (meth) acrylate other than (F), and (D) a photopolymerization initiator.

(6) The curable resin composition for surface protection according to the above (5), wherein (F) is at least one member selected from the group consisting of polybutadiene, polyisoprene, and a hydrogenated product of polybutadiene or polyisoprene.

(7) The curable resin composition for surface protection according to the above (5) or (6), which further contains (H) an inorganic filler.

(8) The curable resin composition for surface protection according to the above (7), wherein (H) is silica.

(9) The curable resin composition for surface protection according to any one of the above (1) to (8), wherein each of (A), (B), (F) and (G) is a hydrophobic (meth)acrylate.

(10) The curable resin composition for surface protection according to the above (1), which comprises from 1 to 50 parts by mass of (A), from 5 to 95 parts by mass of (B), and from 0.1 to 50 parts by mass of (C).

(11) The curable resin composition for surface protection according to the above (2), which comprises from 1 to 50 parts by mass of (A), from 5 to 95 parts by mass of (B), from 0.1 to 50 parts by mass of (C), and from 0.1 to 20 parts by mass of (D).

(12) The curable resin composition for surface protection according to the above (3), which comprises from 1 to 50 parts by mass of (A), from 5 to 95 parts by mass of (8), from 0.1 to 50 parts by mass of (C), from 0.1 to 20 parts by mass of (D), and from 0.5 to 10 parts by mass of (E).

(13) The curable resin composition for surface protection according to the above (5), which comprises from 20 to 90 parts by mass of (F), from 10 to 80 parts by mass of (G), and from 0.1 to 20 parts by mass of (D).

(14) The curable resin composition for surface protection according to any one of the above (5) to (9) and (13), which has a viscosity of at least 5,000 mPa·s.

(15) An adhesive comprising the curable resin composition for surface protection as defined in any one of the above (1) to (4), (9), (10), (11), (12) and (13).

(16) A member to be processed, having a cured product of the curable resin composition for surface protection as defined in any one of the above (1) to (14) provided on its surface.

(17) A method for protecting the surface of a member to be processed, which comprises providing a protective film made of a cured product of the curable resin composition for surface protection as defined in any one of the above (1) to (14), on the surface of the member to be processed, processing the member to be processed, and removing the protective film from the member to be processed.

(18) The method for protecting the surface of a member to be processed according to the above (17), wherein when the protective film is removed from the member to be processed, at least the protective film is immersed in warm water of at most 90° C.

(19) The method for protecting the surface of a member to be processed according the above (17) or (18), wherein the protective film is provided on the surface of a member to be processed by screen printing.

(20) A method for temporarily fixing a member to be processed, which comprises bonding the member to be processed to a substrate by means of the curable resin composition for surface protection as defined in any one of the above (1) to (14), curing the composition, processing the member to be processed, and immersing the processed member in warm water of at most 90° C., thereby to remove a cured product of the curable resin composition for surface protection.

(21) A method for removing a protective film, which comprises providing a protective film made of the curable resin composition for surface protection as defined in any one of the above (1) to (14) on the surface of a member to be processed, processing the member to be processed, and removing the protective film from the member to be processed, wherein a sheet is bonded to the surface of the member to be processed and/or the protective film, and the member to be processed is separated from the protective film and the sheet, or the protective film is separated from the member to be processed and the sheet.

(22) The method for removing a protective film according to the above (21), wherein when the member to be processed is separated from the protective film and the sheet, at least the protective film is brought into contact with warm water.

(23) The method for removing a protective film according to the above (21) or (22), wherein the sheet bonded to the surface of the member to be processed and/or the to protective film, is a pressure-sensitive adhesive sheet comprising a substrate and an adhesive layer formed on the substrate.

(24) The method for removing a protective film according to the above (23), wherein the adhesive layer of the sheet is an adhesive curable with energy rays.

(25) The method for removing a protective film according to the above (23) or (24), wherein the protective film and the sheet adhesive layer are combined by irradiating the sheet with energy rays.

Effects of the Invention

The method for removing a protective film of the present invention contributes to labor saving, energy saving and reduction in operation time as compared with a conventional hot-melt adhesive, since a protective film made of a curable resin composition is photocurable due to its composition, i.e. it is cured by active energy rays such as visible light or ultraviolet rays.

Further, the protective film made of the curable resin composition shows a high adhesive strength without being influenced by e.g. cutting water used at the time of processing, whereby it hardly causes displacement during processing of a component, and it is capable of protecting the component from infiltration of cutting water or from scars or contamination by e.g. cutting wastes. In addition, with respect to the removal of the protective film from the member to be processed after processing, by bonding a sheet to the surface of the member to be processed and/or the protective film, the removal is carried out easily without adhesive residue with excellent workability.

Further, when a protective film having a specific composition is used, by bringing the protective film into contact with warm water of at least 30° C., particularly warm water of at most 90° C., the adhesive strength will be lowered, and the bonding force between members or between a member and a jig will decrease, whereby the member will be readily recovered. Accordingly, it is not necessary to use an organic solvent which is expensive, which is highly flammable and which generates a gas harmful to the human body, as in the case of an adhesive used for a conventional surface protective film.

Further, the method is excellent in workability since the sheet used is a pressure-sensitive adhesive sheet comprising an adhesive layer formed on a substrate. Particularly in a case where the adhesive layer of the sheet is an adhesive curable with energy rays, the adhesive force will decrease by irradiation with energy rays. Further, since the protective film and the sheet covering the member to be processed are removed as combined, the member will be recovered without complexity.

Further, a curable resin composition having a specific preferred composition provides excellent workability since its cured product swells when brought into contact with warm water of at most 90° C., whereby it can be recovered in the form of a film from the member.

The curable resin composition for surface protection of the present invention contributes to labor saving, energy saving and reduction in operation time since it has a viscosity with which screen printing is applicable, in the preferred embodiments.

BEST MODE FOR CARRYING OUT THE INVENTION

In the present invention, the curable resin composition forming a protective film comprises (A) a polyfunctional (meth)acrylate, (B) a monofunctional (meth)acrylate, (C) a resin having a cyclopentadiene skeleton, and (D) a photopolymerization initiator.

(A) to be used for the curable resin composition is a polyfunctional (meth)acrylate oligomer/polymer having at least two (meth)acryloyl groups at the terminals or in the side chains of the oligomer/polymer, or a monomer having at least two (meth)acryloyl groups.

As examples thereof, the polyfunctional (meth)acrylate oligomer/polymer may, for example, be 1,2-polybutadiene-terminated urethane (meth)acrylate (e.g. "TE-2000" or "TEA-1000", manufactured by NIPPON SODA CO., LTD.), a hydrogenated product of the above acrylate (e.g. "TEAI-1000" manufactured by NIPPON SODA CO., LTD.), 1,4-polybutadiene-terminated urethane (meth)acrylate (e.g. "BAC-45", manufactured by OSAKA ORGANIC CHEMICAL INDUSTRY LTD.), polyisoprene-terminated (meth)acrylate, polyester urethane (meth)acrylate, polyether urethane (meth)acrylate, polyester (meth)acrylate, or bis-A type epoxy (meth)acrylate (e.g. "Biscoat #540" manufactured by OSAKA ORGANIC CHEMICAL INDUSTRY LTD., or "Biscoat VR-77" manufactured by SHOWA HIGHPOLYMER CO., LTD.).

Further, among monomers having at least two (meth)acryloyl groups, a bifunctional (meth)acrylate monomer may, for example, be 1,3-butylene glycol di(meth)acrylate, 1,4-butanediol di(meth)acrylate, 1,6-hexadiol di(meth)acrylate, 1,9-nonanediol di(meth)acrylate, neopentyl glycol di(meth)acrylate, dicyclopentanyl di(meth)acrylate, 2-ethyl-2-butylpropanediol (meth)acrylate, neopentyl glycol-modified trimethylol propane di(meth)acrylate, stearic acid-modified pentaerythritol diacrylate, polypropylene glycol di(meth)acrylate, 2,2-bis(4-(meth)acryloxy diethoxyphenyl)propane, 2,2-bis(4-(meth)acryloxy propoxyphenyl)propane or 2,2-bis(4-(meth)acryloxy tetraethoxyphenyl)propane.

A trifunctional (meth)acrylate monomer may, for example, be trimethylolpropane tri(meth)acrylate or tris[(meth)acryloxyethyl]isocyanurate.

A tetrafunctional or higher-functional (meth)acrylate monomer may, for example, be dimethylolpropane tetra(meth)acrylate, pentaerythritol tetra(meth)acrylate, pentaerythritolethoxy tetra(meth)acrylate, dipentaerythritol penta(meth)acrylate or dipentaerythritol hexa(meth)acrylate.

(A) to be used for the curable resin composition is more preferably hydrophobic. If it is water-soluble, a protective film made of the curable resin composition may swell by cutting water during processing, to cause displacement or removing, infiltration of cutting water, scars or contamination by e.g. cutting wastes and degrade machining accuracy, such being undesirable. However, it may be hydrophilic unless the protective film made of the curable resin composition significantly swells or dissolves in part with water.

The amount of (A) to be used for the curable resin composition is preferably from 1 to 50 parts by mass, more preferably from 5 to 40 parts by mass, per 100 parts by mass of the total amount of (A) and (B). When it is at least 1 part by mass, the removability will not decrease, or the protective film made of the curable resin composition will remain in the film form, and when the amount is at most 50 parts by mass, the initial adhesion will not decrease due to too significant shrinkage on curing.

(B) to be used for the curable resin composition may, for example, be methyl (meth)acrylate, ethyl (meth)acrylate, propyl (meth)acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, methoxylated cyclodecatriene (meth)acrylate, 2-hydroxyethyl (meth)acrylate, 2-hydroxypropyl (meth)acrylate, 3-hydroxypropyl (meth)acrylate, 4-hydroxybutyl (meth)acrylate, tetrahydrofurfuryl (meth)acrylate, 2-hydroxy-3-phenoxypropyl (meth)acrylate, glycidyl (meth)acrylate, caprolactone-modified tetrahydrofurfuryl (meth)acrylate, 3-chloro-2-hydroxypropyl (meth)acrylate, N,N-dimethylaminoethyl (meth)acrylate, N,N-diethylaminoethyl (meth)acrylate, t-butylaminoethyl (meth)acrylate, ethoxycarbonylmethyl (meth)acrylate, phenol ethylene oxide-modified acrylate, phenol(2-mol ethylene oxide-modified) acrylate, phenol(4-mol ethylene oxide-modified) acrylate, paracumylphenol ethylene oxide-modified acrylate, nonylphenol ethylene oxide-modified acrylate, nonylphenol (4-mol ethylene oxide-modified) acrylate, nonylphenol (8-mol ethylene oxide-modified) acrylate, nonylphenol (2.5-mol propylene oxide-modified) acrylate, 2-ethylhexyl carbitol acrylate, ethylene oxide-modified phthalic acid (meth)acrylate, ethylene oxide-modified succinic acid (meth)acrylate, trifluoroethyl (meth)acrylate, acrylic acid, methacrylic acid, maleic acid, fumaric acid, o-carboxy-polycaprolactone mono(meth)acrylate, phthalic acid monohydroxyethyl (meth)acrylate, (meth)acrylic acid dimer, β-(meth)acroyloxyethyl hydrogen succinate, or n-(meth)acryloyloxyalkyl hexahydrophthalimide.

Like (A), (B) to be used for the curable resin composition is more preferably hydrophobic. If it is water-soluble, the protective film made of the curable resin composition may swell by cutting water during processing, to cause displacement or removing, infiltration of cutting water, scars or contamination by e.g. cutting wastes, and degrade machining accuracy, such being undesirable. However, it may be hydrophilic unless the protective film made of the curable resin composition significantly swells or dissolves in part with water.

The amount of (B) to be used for the curable resin composition is preferably from 5 to 95 parts by mass, more preferably from 10 to 80 parts by mass, per 100 parts by mass of the total amount of (A) and (B). When it is at least 5 parts by mass, sufficient initial adhesion will be obtained, and when it is at most 95 parts by mass, sufficient releasability will be obtained, and a protective film made of the curable resin composition will be obtained in the film form.

The adhesion to a metal surface can be further improved by using, in combination with the above blend composition of (A) and (B), a phosphate having a vinyl group or a (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate or (meth)acryloyloxyethyl polyethylene glycol acid phosphate.

Further, in the present invention, a curable resin composition for surface protection comprising (F), (G) and (D) a photopolymerization initiator may suitably be used, where the (meth)acrylate is classified into (F) a (meth)acrylate having at least one (meth)acryloyl group at the terminal or in the side chain of its molecule and having a molecular weight of at least 500, and (G) a (meth)acrylate other than (F).

Here, (F) may be a commercially available polyfunctional (meth)acrylate oligomer/polymer exemplified for the above (A).

The molecular weight of (F) is selected to be at least 500 with a view to obtaining a viscosity with which screen printing is possible. It is not necessary to define the upper limit with a technological viewpoint, but the curable resin composition for surface protection is preferably liquid from the viewpoint of workability, and further, preferred is one having a molecular weight of at most 100,000 from the reason of solubility in the other (meth)acrylate monomer. The molecular weight of (F) is more preferably from 1,000 to 50,000.

(F) is preferably at least one member selected from the group consisting of polybutadiene, polyisoprene and hydrogenated products of the former two, whereby the removal nature of the cured product of the curable resin composition for surface protection from the adherend (hereinafter referred to simply as "the removability") will be improved when the cured product is immersed in warm water.

In the present invention, the addition amount of (F) is preferably from 20 to 90 parts by mass, more preferably from 25 to 85 parts by mass, per 100 parts by mass of the total amount of (F) and (G). When it is at least 20 parts by mass, sufficient removability will be obtained, and a viscosity with which screen printing is applicable can be secured. Further, if it is at most 90 parts by mass, workability will not decrease due to the viscosity increase.

(F) is preferably hydrophobic. If it is water-soluble, the cured product of the curable resin composition for surface protection may swell or dissolve in part during cutting, to cause displacement and degrade machining accuracy, such being undesirable. However, it may be hydrophilic unless the cured product of the curable resin composition for surface protection significantly swells or dissolves in part with water.

Further, (G) may be the monofunctional (meth)acrylate monomer exemplified for the above (B), or the polyfunctional (meth)acrylate monomer (bifunctional, trifunctional or tetrafunctional (meth)acrylate monomer) exemplified for the above (A).

The addition amount of (G) to be used in the present invention is preferably from 10 to 80 parts by mass, more preferably from 15 to 75 parts by mass, per 100 parts by mass of the total amount of (F) and (G). If it is less than 10 parts by mass, the initial adhesion may decrease, and if it exceeds 80 parts by mass, the releasability may decrease.

The adhesion to a metal surface can be further improved by using, in combination with the above blend composition of (F) and (G), a phosphate having a vinyl group or a (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate or (meth)acryloyloxyethyl polyethylene glycol acid phosphate.

Like (F), (G) to be used in the present invention is more preferably hydrophobic. If it is water-soluble, the protective film made of the curable resin composition for surface protection may swell by cutting water during processing, to cause displacement or removing, infiltration of cutting water, scars or contamination by e.g. cutting wastes, and degrade machining accuracy, such being undesirable. However, it may be hydrophilic unless the protective film made of the curable resin composition for surface protection significantly swells or dissolves in part with water.

The surface curing property can be further improved by using, in combination with the curable resin composition for surface protection of the present invention, (C) a resin having a cyclopentadiene skeleton.

(C) may, for example, be a petroleum resin produced from cyclopentadiene extracted from a C5 fraction as the chief material. Specifically, e.g. "Quintone 1700", "Quintone 1500" or "Quintone 1325", manufactured by ZEON CORPORATION may, for example, be mentioned.

(C) to be used for the curable resin composition may be any resin so long as it has a cyclopentadiene skeleton, but preferred is one having a softening point of from 50° C. to 200° C., and more preferred is one having a number average molecular weight (Mn) of from 300 to 600 in view of solubility.

The amount of (C) to be used for the curable resin composition is preferably from 0.5 to 50 parts by mass, more preferably from 1 to 40 parts by mass per 100 parts by mass of the total amount of (A) and (B). When it is at least 0.5 part by mass, a film will be formed without adhesive residue, and when it is at most 50 parts by mass, sufficient adhesion will be obtained.

(D) to be used for the curable resin composition is incorporated in order to effect sensitization with active energy rays such as visible light or ultraviolet rays to enhance the photocuring property of the curable resin composition, and can be one of various known photopolymerization initiators.

Specifically, it may, for example, be benzophenone or its derivative; benzyl or its derivative; anthraquinone or its derivative; benzoin or a benzoin derivative such as benzoin methyl ether, benzoin ethyl ether, benzoin propyl ether, benzoin isobutyl ether or benzyl dimethyl ketal; an acetophenone derivative such as diethoxyacetophenone, or 4-t-butyltrichloroacetophenone; 2-dimethylaminoethyl benzoate, p-dimethylaminoethyl benzoate, diphenyl disulfide, thioxanthone or their derivatives; camphor quinone or a camphor quinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethylester, 7,7-dimethyl-2,3-dioxobicyclo[2.2.1]heptane-1-carboxy-2-methyl ester or 7,7-dimethyl-2,3-dioxobicyclo[2.2.1]heptane-1-carboxylic acid chloride; an α-amino alkylphenone derivative such as 2-methyl-1-[4-(methylthio)phenyl]-2-morpholino propan-1-one or 2-benzyl-2-dimethylamino-1-(4-morpholino phenyl)-butanone-1; or an acyl phosphine oxide derivative such as benzoyl diphenyl phosphine oxide, 2,4,6-trimethyl benzoyl diphenyl phosphine oxide, benzoyl diethoxyphosphine oxide, 2,4,6-trimethyl benzoyl dimethoxyphenyl phosphine oxide or 2,4,6-trimethyl benzoyl diethoxyphenyl phosphine oxide. The photopolymerization initiators can be used alone or in combination as a mixture of two or more of them.

The addition amount of (D) to be used for the curable resin composition is preferably from 0.1 to 20 parts by mass, more preferably from 3 to 20 parts by mass, per 100 parts by mass of the total amount of (A) and (B), or (F) and (G). When the amount is at least 0.1 part by mass, it is possible to obtain the effect of promoting the curing. On the other hand, when the amount is at most 20 parts by mass, a sufficient curing rate can be obtained. A more preferred embodiment is such that (D) is added by at least 3 parts by mass, which is further preferred in that the composition becomes curable regardless of the light irradiation level, the crosslinking degree of the cured product of the curable resin composition becomes higher, no displacement occurs during cutting, and the removability is improved.

Further, it is certainly possible to develop a phenomenon such that the adhesive strength of the protective film made of the curable resin composition is lowered when it swells by contact with warm water, by using (E) a polar organic solvent in combination with the curable resin composition comprising (A), (B), (C) and (D), or (F), (G) and (D), or the like.

(E) preferably has a boiling point of at least 50° C. and at most 130° C. When a polar organic solvent having a boiling point within the above range is selected, it is more certainly possible to develop a phenomenon such that the adhesive strength of the curable resin composition after curing is lowered by contact with warm water, such being desirable.

Such a polar organic solvent may, for example, be an alcohol, a ketone or an ester. As a result of a study by the present inventors, an alcohol is preferably selected among them.

The alcohol may, for example, be methanol, ethanol, n-propanol, isopropanol, n-butanol, isobutanol, secondary butanol, tertiary butanol, n-amyl alcohol, isoamyl alcohol or 2-ethyl butyl alcohol.

Among them, methanol, ethanol, n-propanol, isopropanol, n-butanol, isobutanol, secondary butanol or tertiary butanol, which has a boiling point of not higher than 120° C., is preferred, and methanol, ethanol, isopropanol or n-butanol is more preferred. Particularly preferred is ethanol or isopropanol, which has a boiling point of not higher than 100° C., which emits little odor and which is not designated as a deleterious substance.

The addition amount of (E) is preferably from 0.5 to 30 parts by mass, more preferably from 1 to 20 parts by mass, per 100 parts by mass of the total amount of (A) and (B), or (F) and (G) in the curable resin composition. When it is at least 0.5 part by mass, releasability will be secured, and when it is at most 30 parts by mass, the initial adhesion will not decrease, and the cured product of the curable resin composition will be removed in the film form.

In order to improve the storage stability, the curable resin composition of the present invention may contain a small amount of a polymerization inhibitor. The polymerization inhibitor may, for example, be methyl hydroquinone, hydroquinone, 2,2-methylene-bis(4-methyl-6-tertiary-butylphenol), catechol, hydroquinone monomethyl ether, monotertiary butyl hydroquinone, 2,5-ditertiary butyl hydroquinone, p-benzoquinone, 2,5-diphenyl-p-benzoquinone, 2,5-ditertiary-butyl-p-benzoquinone, picric acid, citric acid, phenothiazine, tertiary-butyl catechol, 2-butyl-4-hydroxyanisole or 2,6-ditertiary-butyl-p-cresol.

The amount of the polymerization inhibitor to be used is preferably from 0.001 to 3 parts by mass, more preferably from 0.01 to 2 parts by mass per 100 parts by mass of the total amount of (A) and (B), or (F) and (G) in the curable resin composition. When the amount is at least 0.001 part by mass, the storage stability will not decrease, and when it is at most 3 parts by mass, the adhesion will not decrease, and the composition can be prevented from being uncured.

To the curable resin composition of the present invention, (H) an inorganic filler may be added in addition to the above respective components depending upon the application, particularly when it is used for e.g. screen printing.

(H) may, for example, be an oxide such as spherical alumina, crushed alumina, magnesium oxide, beryllium oxide or titanium oxide, a nitride such as boron nitride, silicon nitride or aluminum nitride, a carbide such as silicon carbide, a hydrated metal such as aluminum hydroxide or magnesium hydroxide, a metal filler such as copper, silver, iron, aluminum or nickel, a metal alloy filler such as titanium, a carbide type filler such as diamond or carbon, silica such as quartz, quartz glass, fused silica, spherical silica or fumed silica, silica sand, fersmanite, clay, talc, calcium carbonate, glass beads or shiras baloon. These inorganic fillers may be used alone or in combination of two or more of them. Among these inorganic fillers, preferred is silica considering photocuring property of the curable resin composition for surface protection, and more preferred is dry method silica considering screen printability, which is easily available.

The dry method silica is, among silica powders, common name white carbon such as a crystalline silica powder, a fused silica powder, a spherical silica powder and a fumed silica powder, a silica produced by subjecting silicon tetrachloride to heat decomposition in the presence of hydrogen and oxygen at a high temperature at a level of 1,000° C. In the dry method silica, silanol groups are exposed to the surface of the particles since the silica interior structure is stable.

Further, in the present invention, the dry method silica may be a surface-treated silica obtained by making silanol groups present on the surface of silica be hydrophobic by reaction with an organic silicon halide or an alcohol, so as to modify the surface and to improve dispersibility. Such a dry method silica may, for example, be "AEROSIL 130", "AEROSIL 200", "AEROSIL 300", "AEROSIL 380", "AEROSIL R972" (each manufactured by NIPPON AEROSIL CO., LTD.), "Cab-O—Sil" (manufactured by G.L. Cabot Corp.), "DC Fine Silica" (manufactured by Dow Corning) or "Fransil 251" (manufactured by Farnsol).

The above dry method silica is used for general purpose, in a case of coating with a coating composition or an adhesive, to increase the structural viscosity of the liquid to prevent dripping, and addition of the dry method silica makes it easy to achieve a viscosity with which screen printing is applicable.

The viscosity of the curable resin composition for surface protection of the present invention is preferably at least 5,000 mPa·s. When it is at least 5,000 mPa·s, no dripping will occur, and a favorable protective film will be obtained. It is more preferably at least 10,000 mPa·s, whereby a more favorable protective film will be obtained by screen printing. Further, the upper limit of the viscosity is suitably selected depending upon the purpose of use of the curable resin composition, and it is preferably at most 2,000,000 mPa·s in the case of screen printing and it is preferably at most 100,000 mPa·s in the case of e.g. brush coating.

Further, the curable resin composition for surface protection of the present invention may contain an additive, such as an elastomer of various type, e.g., acryl rubber, urethane rubber or acrylonitrile-butadiene-styrene rubber, a solvent, an extender, a reinforcing material, a plasticizer, a thickener, a dye, a pigment, a flame retardant, a silane coupling agent or a surfactant, within a range not to impair the object of the present invention.

The sheet to be used in the present invention is one comprising a substrate and an adhesive layer of e.g. a rubber type adhesive such as natural rubber, styrene-butadiene rubber, isobutyrene rubber, isoprene rubber, a styrene-isoprene rubber block copolymer or a styrene-butyrene block copolymer or an acrylic type, a silicone type, a polyurethane type or a polyvinylether type adhesive, formed on the substrate e.g. by coating or impregnation, the substrate being e.g. paper such as craft paper, Japanese paper or crepe paper, cloth such as a single or mixed woven fabric of e.g. rayon, cotton, glass, polyester or vinylon, cloth made of e.g. spun polypropylene fibers, or a non-woven fabric of e.g. rayon, polypropylene, aromatic polyamide, polyester or glass, a plastic film of e.g. cellophane, acetate, polyolefin such as polyvinyl chloride, polyethylene or polypropylene, polyester, polytetrafluoroethylene, polyethylene terephthalate (PET) or polyimide, a rubber sheet of a single substance or a mixture of e.g. natural rubber, styrene butadiene rubber, butyrene rubber or polychloroprene rubber, a foam of e.g. polyurethane, polyethylene, butyl rubber, polystyrene, polychloroprene rubber or acrylic rubber or a metal foil of e.g. aluminum, copper or stainless steel. So-called a marking film tape such as a label or a sticker, an adhesive film, an adhesive sheet or an adhesive tape may, for example, be used.

Further, the shape and the form are not limited so long as it is a sheet-shaped one which can be bonded to the surface of the member to be processed, such as a thermosetting adhesive sheet comprising the above support coated with an epoxy type, polyimide type or polyurethane type resin.

Among the sheets to be used in the present invention, preferred is a pressure-sensitive adhesive sheet comprising the above substrate and a pressure-sensitive adhesive layer of e.g. an acrylic copolymer, in view of easiness of bonding operation.

Further, the adhesive layer of the above sheet preferably comprises an adhesive curable with energy rays, whereby the sheet will be easily removed from the member to be processed, since the adhesive force will be significantly reduced after irradiation with energy rays. Specifically, the sheet employing such an adhesive curable with energy rays may, for example, be a dicing tape or a backgrinding tape to be used as an adhesive for fixing, at the time of grinding and/or cutting, e.g. a circuit board such as a silicon wafer or a glass-reinforced epoxy resin or a ceramic which employs, as the substrate, polyvinyl chloride or polyolefin which is relatively stretchable.

The above sheet is such a sheet that the substrate is expanded and pushed up upon irradiation with energy rays, and the member to be processed such as an aimed chip is picked up and is thereby separated. For example, the member to be processed is coated with a protective film, and a dicing tape as an adhesive for fixation is bonded to the surface of the member to be processed coated with the protective film, and the member to be processed is cut by a cutting apparatus such as a dicer. Then, energy rays are applied to weaken the adhesive force, the tape is expanded, and the member to be processed is picked up.

The adhesive curable with energy rays comprises, as the main components, a pressure-sensitive adhesive made of an acrylic copolymer and a compound polymerizable by energy rays, and accordingly such an effect will also be obtained that it is not troublesome to recover members since the sheet can be removed together with the protective film made of the curable resin composition.

The sheet may be preliminarily bonded to the protective film before processing, or it may be bonded to the protective film after processing, depending upon the manner of processing.

In the present invention, after the above sheet is bonded to the member to be processed and/or the protective film, an appropriate outer force is applied to e.g. the member to be processed, the protective film and the sheet, whereby the member to be processed can be separated from the protective film and the sheet, or the protective film can be separated from the member to be processed and the sheet.

The present invention provides a method for removing a protective film, which comprises providing a protective film made of a curable resin composition on the surface of a member to be processed, processing the member to be processed and removing the protective film from the member to be processed, wherein a sheet is bonded to the surface of the member to be processed and/or the protective film, and the member to be processed is separated from the protective film and the sheet, or the protective film is separated from the member to be to processed and the sheet.

According to the preferred embodiment of the present invention, to separate the member to be processed from the protective film and the sheet, at least the protective film is brought into contact with warm water so that the protective film will swell and be softened. Thus, in a case where a sheet is bonded to the protective film, the protective film will be combined with the sheet and easily removed, and the member to be processed will easily be recovered, such being excellent in workability.

Further, the present invention provides the following method for temporarily fixing a member to be processed.

Namely, a method for temporarily fixing a member, which comprises bonding a member to be processed to a substrate by means of the curable resin composition which loses the adhesive strength upon contact with warm water of at most 90° C., curing the curable resin composition to temporarily fix the member, then processing the temporarily fixed member and immersing the processed member together with the substrate if required in warm water to remove the cured adhesive, whereby various members such as optical members can be processed with high machining accuracy, without use of an organic solvent.

According to a preferred embodiment of the present invention, at the time of removing the member, the cured product of the curable resin composition is brought into contact with warm water of at most 90° C. to swell and is removed in the form of a film from the member, whereby it is possible to obtain an effect of excellent workability.

In the temporary fixation method of the present invention, by the use of an adhesive made of the curable resin composition of the present invention, it is possible to certainly obtain the above effect.

In the present invention, use of warm water appropriately heated to at most 90° C. is preferred in terms of productivity because the removability is thereby achieved in a short period of time. The temperature of the warm water is from 30 to 90° C., preferably from 40 to 80° C.

Use of warm water is preferred because the protective film made of the curable resin composition will swell or be softened a little in a short period of time, whereby after bonding the sheet to the protective film, the protective film in the form of a film is combined with the sheet and removed together.

The method of bringing the protective film and warm water into contact is not particularly limited. Either method of immersing the member to be processed having the protective film provided thereon or only the protective film portion in warm water, and then bonding a sheet, or a method of immersing a member to be processed having the protective film provided thereon and having a sheet bonded thereto, in warm water, may be employed. By removing the sheet after immersion in warm water, the member to be processed will be more easily separated from the protective film and the sheet, or the protective film will be more easily separated from the member to be processed and the sheet.

In the present invention, use of a protective film made of a curable resin composition comprising (A) a polyfunctional (meth)acrylate, (B) a monofunctional (meth)acrylate, (C) a resin having a cyclopentadiene skeleton and (D) a photopolymerization initiator, is preferred because it is possible to certainly obtain the effect of the invention. Further, use of a protective film made of a curable resin composition further containing (E) a polar organic solvent is more preferred.

By bringing the protective film made of the curable resin composition of the present invention into contact with warm water, the residual stress in curing is released, whereby the adhesive strength will be reduced, and particularly the vapor pressure of (E) a polar organic solvent functions together with a removing force thereby enabling the protective film to be easily removed in the form of a film from the member to be processed.

In the present invention, the material of the member to be temporarily fixed and the substrate is not particularly limited, and in a case where the adhesive is an ultraviolet-curable adhesive, the member and the substrate are preferably made of a UV transmitting material. Examples of such materials include crystal members, glass members, plastic members and wafers.

The temporary fixation method of the present invention can be applied to temporary fixation in processing of e.g. glass lenses, plastic lenses, wafers and optical disks.

With respect to the method of using the adhesive in the temporary fixation method, assuming a case where a photocurable adhesive is used as the adhesive, for example, an appropriate amount of the adhesive is applied to one of or both sides of the member to be fixed or the substrate, and visible light or ultraviolet rays are applied to the adhesive to the member or the substrate, to cure the photocurable adhesive to temporarily fix the member.

Then, the temporarily fixed member is subjected to processing such as cutting, grinding, polishing or drilling into a desired shape, and then the member is immersed in water preferably warm water, whereby the cured product of the adhesive can be removed from the member.

Further, the present invention provides a method for protecting the surface of a member to be processed, which comprises covering the surface of the member to be processed with the curable resin composition, curing the composition, processing the member to be processed, and immersing the processed member in a warm water of at most 90° C. thereby to remove a cured product of the curable resin composition. Namely, by coating the unprocessed surface of the member to be processed with the curable resin composition and curding the composition, it is possible to prevent the surface from being stained during the processing or to prevent chipping.

Further, the present invention provides a method for protecting the surface of a member to be processed, which comprises providing a protective film made of a curable resin composition for surface protection on the surface of the member to be processed, processing the member to be processed, and removing the protective film from the member to be processed.

By the above method, e.g. a ceramic, glass, an optical component such as quartz or an electric or electronic component such as a sensor, is protected from infiltration of cutting water during processing or from scars or contamination of the member to be processed by e.g. cutting wastes. Further, the protective film functions as a protective film suitable to prevent contamination by a plating liquid to be used for a circuit board such as a printed wiring board, or for masking at the time of painting or printing of various tablets such as nameplates or logos, scales on measuring instruments or decorations.

As a method of providing a protective film on the surface of the member to be processed, an optional application method may be employed, such as brush coating, various coating methods, screen printing, flexographic printing, spraying, potting or dipping. Among them, it is preferred to employ screen printing.

Screen printing is one type of stencil printing, and is a printing method utilizing the mesh of a screen of fibers of e.g. silk, nylon or tetron, or a stainless steel wire. The printing method is utilized in various fields since printing is possible even on a convex plate, a flat plate, a concave plate or a curved plate. By screen printing, it is possible to apply the curable composition for surface protection without displacement even at a fine portion, such being preferred in view of workability.

In the present invention, the material of the member to be processed is not particularly limited. The material may, for example, be a metal member such as aluminum, iron, SUS or nickel, a glass member, a ceramic member such as alumina or aluminum nitride, a plastic member or a wafer such as silicon or sapphire.

The method for removing a protective film of the present invention is applicable not only to processing of a glass lens, a plastic lens, an optical component such as glass or quartz, or an optical disk but also to processing of a metal plate, a mold, an aluminum sash, a plastic plate, a semiconductor wafer, a circuit board, a ceramic, or an electric or electronic component such as a sensor.

Particularly, it is useful as a method for removing a protective film from a member to be processed such as a sensor component or a circuit board having recesses and protrusions on its surface, which should be protected from infiltration of cutting water or scars or contamination by e.g. cutting wastes.

Further, the present invention is useful for prevention of contamination by a plating liquid to be used for a circuit board such as a printed wiring board, or for masking at the time of painting or printing of various tablets such as nameplates or logos, scales on measuring instruments and decorations applied to various industrial products, in addition to electric or electronic components.

EXAMPLES

Now, the present invention will be described in further detail with reference to Examples and Comparative Examples, but it should be understood that the present invention is by no means restricted by such Examples.
(Materials Used)

Materials used in Examples and Comparative Examples are exemplified below.

I-907: 2-methyl-1-[4-(methylthio)phenyl]-2-morpholino propan-1-one (IRGACURE 907, manufactured by Ciba Specialty Chemicals)

QM: dicyclopentenyloxyethyl methacrylate (QM-657, manufactured by Rohm & Haas)

BZ: benzyl methacrylate (LIGHT-ESTER BZ, manufactured by KYOEISHA CHEMICAL CO., LTD.)

IBX: isobornyl methacrylate (LIGHT-ESTER IB-X, manufactured by KYOEISHA CHEMICAL CO., LTD.)

2-HEMA: 2-hydroxyethyl methacrylate

MTEGMA: methoxytetraethylene glycol monomethacrylate (NK ester M-90G, manufactured by Shin-Nakamura Chemical Corporation)

TPO: 2,4,6-trimethylbenzoyldiphenylphosphine oxide (Lucirin Tpo, Manufactured by Basf)

UC-203: methacryloyl-modified polyisoprene (UC-203, manufactured by KURARAY CO., LTD)

TE-2000: 1,2-polybutadiene-terminated urethane methacrylate (TE-2000, manufactured by Nippon Soda Co., Ltd., molecular weight 2,000)

UV7000B: urethane acrylate (SHIKOH UV-7000B, manufactured by Nippon Synthetic Chemical Industry Co., Ltd., molecular weight 3,500)

UV3000B: polyester urethane acrylate (SHIKOH UV-3000B, manufactured by Nippon Synthetic Chemical Industry Co., Ltd., molecular weight 18,000)

M-101A: phenol 2 mol ethylene oxide-modified acrylate (ARONIX M-101A, manufactured by TOAGOSEI CO., LTD.)

M-140: 2-(1,2-cyclohexacaboxyimide)ethyl acrylate (Aronix M-140, Manufactured by Toagosei Co., Ltd.)

IBXA: isobornyl acrylate (LIGHT-ACRYLATE IB-XA, manufactured by KYOEISHA CHEMICAL CO., LTD.)

R-684: dicyclopentanyl diacrylate (KAYARAD R-684, manufactured by Nippon Kayaku Co, Ltd.)

ACMO: acryloyl morpholine (ACMO, manufactured by KOHJIN Co., Ltd.)

BDK: benzyl dimethyl ketal

MDP: 2,2-methylene-bis(4-methyl-6-tertiary butylphenol)

Quintone 1700: cyclopentadiene resin (Quintone 1700, manufactured by ZEON CORPORATION)

AEROSIL R972: AEROSIL (manufactured by NIPPON AEROSIL CO., LTD.)

IPA: isopropyl alcohol (Evaluation Methods)

Viscosity: The viscosity of a curable resin composition for surface protection prepared was measured by using a Brookfield type viscometer at a temperature of 23° C.

Surface curing property: Heat resistance Pyrex (registered trademark) glass was coated with a preliminarily prepared curable resin composition for surface protection with a coating thickness of about 70 μm by screen printing. Then, the composition was cured by a curing apparatus using a metal halide lamp manufactured by EYE GRAPHICS CO., LTD. under a condition of an accumulated quantity of light of 2,000 mJ/cm$^2$ at a wavelength of 365 nm. Immediately after the curing, the surface curing property was evaluated by touching with a finger based on the following evaluation standards.

○: favorable without tacking

Δ: tacking a little felt

X: the composition stuck to the fingertip

Tensile shear bond strength: The strength was measured in accordance with JIS K 6850. Specifically, heat resistant Pyrex (registered trademark) glass (25 mm×25 mm×2.0 mm in thickness) was used as an adherend, and two sheets of the heat resistant Pyrex (registered trademark) glass were bonded in a bonding area with a diameter of 8 mm with a preliminarily prepared curable resin composition. Then, the composition was cured by a curing apparatus using an electrodeless discharge lamp manufactured by Fusion UV Systems Inc., under a condition of an accumulated quantity of light of 2,000 mJ/cm$^2$ at a wavelength of 365 nm, thereby preparing a test piece for tensile shear bond strength. The test piece thus prepared was subjected to measurement of tensile shear bond strength by means of a universal testing machine at a temperature of 23° C. under a humidity of 50% at a pulling rate of 10 mm/min.

Removing test (1): A preliminarily prepared curable resin composition was applied to heat resistant Pyrex (registered trademark) glass. Then, the curable composition was cured by a curing apparatus using an electrodeless discharge lamp manufactured by Fusion UV Systems Inc., under a condition of an accumulated quantity of light of 2,000 mJ/cm$^2$ at a wavelength of 365 nm, thereby preparing a test piece for the removing test as a protective film. The obtained test piece was immersed in warm water (80° C.) and taken out every 5 minutes, and a gummed tape (Caralyan Tape, manufactured by Denki Kagaku Kogyo Kabushiki Kaisha) as a sheet was bonded to the protective film and then removed, to measure the period of time in which the protective film was removed from heat resistant Pyrex (registered trademark) glass.

Removing test (2): A test piece for removing test having a protective film formed thereon was prepared in the same manner as in Removing test (1) except that polycarbonate was used as the adherend. The obtained test piece was subjected to the test in the same manner to measure the period of time in which the protective film was removed from polycarbonate.

Example 1-1

20 Parts by mass of TE-2000 and 15 parts by mass of R-684, as (A) polyfunctional (meth)acrylate, 40 parts by mass of M-140 and 25 parts by mass of M-101A, as (B) polyfunctional (meth)acrylate, i.e. 100 parts by mass in total of (A) and (B), 1 part by mass of Quintone 1700 as (C) a resin having a cyclopentadiene skeleton, 10 parts by mass of BDK as (D) a photopolymerization initiator, 2 parts by mass of IPA as (E) a polar organic solvent, and 0.1 part by mass of MDP as a polymerization inhibitor, were blended to prepare a curable resin composition. Using the obtained curable resin composition, the measurement of tensile shear bond strength and removing test were carried out by the above evaluation methods. The results are shown in Table 1-1.

Examples 1-2 to 1-21

Curable resin compositions were prepared in the same manner as in Example 1-1 except that raw materials of types as identified in Tables 1-1 and 1-2 were used in compositions as identified in Tables 1-1 and 1-2. The measurement of tensile shear bond strength and the removing test were carried out in the same manner as in Example 1-1, with respect to the obtained curable resin compositions. The results are shown in Tables 1-1 and 1-2.

TABLE 1-1

| Ex. | 1-1 | 1-2 | 1-3 | 1-4 | 1-5 | 1-6 | 1-7 | 1-8 | 1-9 | 1-10 | 1-11 |
|---|---|---|---|---|---|---|---|---|---|---|---|
| Component (A) (parts by mass) | | | | | | | | | | | |
| TE-2000 | 20 | 20 | 20 | 20 | 20 | 20 | 20 | 20 | 20 | 20 | 20 |
| R-684 | 15 | 15 | 15 | 15 | 15 | 15 | 15 | 15 | 15 | 15 | 15 |
| Component (B) (parts by mass) | | | | | | | | | | | |
| M-140 | 40 | 40 | 40 | 40 | 40 | 40 | 40 | 40 | 40 | 40 | 40 |
| M-101A | 25 | 25 | 25 | 25 | 25 | 25 | 25 | 25 | 25 | 25 | 25 |

TABLE 1-1-continued

| Ex. | 1-1 | 1-2 | 1-3 | 1-4 | 1-5 | 1-6 | 1-7 | 1-8 | 1-9 | 1-10 | 1-11 |
|---|---|---|---|---|---|---|---|---|---|---|---|
| Component (E) | | | | | | | | | | | |
| IPA (b.p. 82° C.) | 2 | 2 | 2 | 2 | 2 | 2 | 2 | 2 | 2 | 2 | 2 |
| (D) photopolymerization initiator (parts by mass) | | | | | | | | | | | |
| BDK | 10 | 10 | 10 | 10 | 10 | 10 | 10 | 10 | 10 | 10 | 10 |
| Component (C) (parts by mass) | | | | | | | | | | | |
| Quintone 1700 | 1 | 5 | 10 | 20 | 50 | 0.5 | | | | | |
| Quintone 1500 | | | | | | | 1 | 3 | 5 | 10 | 20 |
| Polymerization inhibitor (parts by mass) | | | | | | | | | | | |
| MDP | 0.1 | 0.1 | 0.1 | 0.1 | 0.1 | 0.1 | 0.1 | 0.1 | 0.1 | 0.1 | 0.1 |
| Adhesive strength (MPa) | 14.5 | 13.7 | 12.2 | 10.4 | 14.0 | 9.9 | 12.0 | 11.9 | 10.5 | 12.8 | 10.1 |
| Removal time in warm water at 80° C. (min.) | 20 | 30 | 22 | 40 | 44 | 120 | 39 | 44 | 79 | 48 | 75 |
| Removal state*) | Film form | Film form | Film form | Film form | Film form | Adhesive residue | Film form | Film form | Film form | Film form | Film form |

*)Film form: The cured adhesive composition was removed in the form of a film from the glass surface with no adhesive residue.
**)Adhesive residue: An uncured adhesive remained on the surface of the cured product.

TABLE 1-2

| Ex. | 1-12 | 1-13 | 1-14 | 1-15 | 1-16 | 1-17 | 1-18 | 1-19 | 1-20 | 1-21 |
|---|---|---|---|---|---|---|---|---|---|---|
| Component (A) (parts by mass) | | | | | | | | | | |
| TE-2000 | 20 | 20 | 20 | 20 | 10 | 10 | 0 | 0 | 20 | 35 |
| R-684 | 15 | 15 | 15 | 5 | 25 | 5 | 25 | 5 | 15 | 35 |
| Component (B) (parts by mass) | | | | | | | | | | |
| M-140 | 40 | 40 | 40 | 40 | 40 | 40 | 40 | 40 | 40 | 15 |
| QM | 25 | | | | | | | | | |
| M-101A | | | | | | | | | 25 | 15 |
| BZ | | 25 | | 35 | 25 | 45 | 35 | 55 | | |
| IBX | | | 25 | | | | | | | |
| Component (E) (parts by mass) | | | | | | | | | | |
| IPA (b.p. 82° C.) | 2 | 2 | 2 | 2 | 2 | 2 | 2 | 2 | 12 | 2 |
| (D) photopolymerization initiator (parts by mass) | | | | | | | | | | |
| BDK | 10 | 10 | 10 | 10 | 10 | 10 | 10 | 10 | 10 | 10 |
| Component (C) (parts by mass) | | | | | | | | | | |
| Quintone 1700 | 20 | 20 | 20 | 20 | 20 | 20 | 20 | 20 | 20 | 20 |
| Polymerization inhibitor (parts by mass) | | | | | | | | | | |
| MDP | 0.1 | 0.1 | 0.1 | 0.1 | 0.1 | 0.1 | 0.1 | 0.1 | 0.1 | 0.1 |
| Adhesive strength (MPa) | 12.1 | 10.8 | 9.8 | 16.3 | 10.7 | 17.8 | 12.8 | 10.3 | 3.7 | 2.8 |
| Removal time in warm water at 80° C. (min.) | 20 | 152 | 283 | 22 | 26 | 81 | 140 | 290 | 5 | 12 |
| Removal state*) | Film form | Film form | Film form | Film form | Film form | Film form | Film form | Film form | Film form | Film form |

Adhesive residue: An uncured adhesive remained on the surface of the cured product.
Film form: The cured adhesive composition was removed in the form of a film from the glass surface with no adhesive residue.

Comparative Examples 1-1 to 1-6

Curable resin compositions were prepared in the same manner as in Example 1-1 except that raw materials of types as identified in Table 1-3 were used in compositions as identified in Table 1-3. The measurement of tensile shear bond strength and the removing test were carried out in the same manner as in Example 1-1, with respect to the obtained curable resin composition. The results are shown in Table 1-3.

TABLE 1-3

| Comp. Ex. | 1-1 | 1-2 | 1-3 | 1-4 | 1-5 | 1-6 |
|---|---|---|---|---|---|---|
| Component (A) (parts by mass) | | | | | | |
| TE-2000 | 20 | | | | | |
| R-684 | 15 | | | | | |
| Component (B) (parts by mass) | | | | | | |
| M-140 | 40 | | | | | |
| M-101A | 25 | | | | | |
| BZ | | 40 | | | | |
| IBX | | 60 | | | | 30 |
| Component (E) (parts by mass) | | | | | | |
| IPA | | 2 | | | | |
| Other components (parts by mass) | | | | | | |
| 2-HEMA | | | | | | 70 |
| MTEGMA | | | 100 | | 70 | |
| Acryloyl morpholine | | | | 100 | 30 | |
| (D) photopolymerization initiator (parts by mass) | | | | | | |
| BDK | 10 | 5 | 1.5 | 1.5 | | |
| TPO | | | | | 2.0 | 2.0 |
| Component (C) (parts by mass) | 20 | 20 | 20 | 20 | 20 | 20 |
| Polymerization inhibitor (parts by mass) | | | | | | |
| MDP | 0.1 | 0.1 | 0.1 | 0.1 | 0.1 | 0.1 |
| Adhesive strength (MPa) | 11.9 | 10.5 | 2.0 | 2.0 | 8.4 | 12.3 |
| Removal time in warm water at 80° C. (min.) | Not removed | Not removed | 30 | 30 | 60 | Not removed |
| Removal state**) | | | Adhesive residue | Adhesive residue | Adhesive residue | |

**)Adhesive residue: Glass was removed, but the cured adhesive composition remained on the glass surface.

Example 1-22

Using the curable resin composition in Example 1-1, the measurement of tensile shear bond strength and the removing test were carried out in the same manner as in Example 1-1 except that the curable resin composition was cured by means of a curing apparatus using an electrodeless discharge lamp manufactured by Fusion UV Systems Inc. under different accumulated light quantities of 500, 1,000, 2,000 and 4,000 mJ/cm² at a wavelength of 365 nm to prepare test pieces for the removing test and for the measurement of tensile shear bond strength. The results are shown in Table 1-4.

Comparative Example 1-7

Using the curable resin composition in Comparative Example 1-6, the measurement of tensile shear bond strength and the removing test were carried out in the same manner as in Example 1-1 except that the curable resin composition was cured by means of a curing apparatus using an electrodeless discharge lamp manufactured by Fusion UV Systems Inc. under different accumulated light quantities of 500, 1,000, 2,000 and 4,000 mJ/cm² at a wavelength of 365 nm to prepare test pieces for the removing test and for the measurement of tensile shear bond strength. The results are shown in Table 1-4.

TABLE 1-4

| | Resin composition No. | | Accumulated light quantities (mJ/cm²) | | | |
|---|---|---|---|---|---|---|
| | | | 500 | 1,000 | 2,000 | 4,000 |
| Ex. 1-22 | Ex. 1-1 | Adhesive strength (MPa) | 14.3 | 13.0 | 14.5 | 14.2 |
| | | Removal time (min) | 16 | 15 | 20 | 10 |
| Comp. Ex. 1-7 | Comp. Ex. 1-6 | Adhesive strength (MPa) | 0 | 0 | 12.3 | 9.8 |
| | | Removal time (min) | — | — | Not removed | Not removed |

Examples 1-23 and 1-23

Using the curable resin compositions in Examples 1-1 and 1-7, test pieces for removing test were prepared in the same manner as in Example 1-1, and removing tests were carried out by changing the temperature of warm water to 40° C., 50° C., 60° C. and 70° C., respectively. The results are shown in Table 1-5. The results show the removability at any temperature.

TABLE 1-5

| Resin composition | | | Temperature of warm water (° C.) | | | |
|---|---|---|---|---|---|---|
| | No. | | 40 | 50 | 60 | 70 |
| Ex. 1-23 | Ex. 1-1 | Removal time (min) | 376 | 222 | 185 | 75 |
| Ex. 1-24 | Ex. 1-7 | Removal time (min) | 192 | 143 | 90 | 70 |

Example 2-1

Parts by mass of TE-2000 and 15 parts by mass of R-684, as (A) polyfunctional (meth)acrylate, 40 parts by mass of n-acryloyloxyethyl hexahydrophthalimide (ARONIX M-140, manufactured by TOAGOSEI CO., LTD., hereinafter abbreviated as "M-140") and 25 parts by mass of M-101A, as (B) polyfunctional (meth)acrylate, i.e. 100 parts by mass in total of (A) and (B), 20 parts by mass of Quintone 1700 as (C) a resin having a cyclopentadiene skeleton, 10 parts by mass of BDK as (D) a photopolymerization initiator, 2 parts by mass of IPA as (E) polar organic solvent, and 0.1 part by mass of MDP as a polymerization inhibitor, were blended to prepare a curable resin composition. Using the obtained curable resin composition, the measurement of tensile shear bond strength, viscosity and surface curability and the removing test were carried out by the above evaluation methods. The results are shown in Table 2-1.

Examples 2-2 to 2-10

Curable resin compositions were prepared in the same manner as in Example 2-1 except that raw materials of types as identified in Table 2-1 were used in compositions as identified in Table 2-1. The measurement of tensile shear bond strength and the removing test were carried out in the same manner as in Example 2-1, with respect to the obtained curable resin compositions. The results are shown in Table 2-1.

TABLE 2-1

| Ex. | — | 2-1 | 2-2 | 2-3 | 2-4 | 2-5 | 2-6 | 2-7 | 2-8 | 2-9 | 2-10 |
|---|---|---|---|---|---|---|---|---|---|---|---|
| Component (A) (parts by mass) | TE-2000 | 20 | 20 | 20 | 20 | 20 | 20 | 20 | 20 | 20 | 20 |
| | R-684 | 15 | 15 | 15 | 15 | 15 | 15 | 15 | 15 | 15 | 15 |
| Component (B) (parts by mass) | M-101A | 25 | 25 | 25 | 25 | 25 | 25 | 25 | 25 | — | — |
| | QM | — | — | — | — | — | — | — | — | 25 | — |
| | BZ | — | — | — | — | — | — | — | — | — | 25 |
| | M140 | 40 | 40 | 40 | 40 | 40 | 40 | 40 | 40 | 40 | 40 |
| | IBX | — | — | — | — | — | — | — | — | — | — |
| Component (D) photo-polymerization initiator (parts by mass) | BDK | 10 | 10 | 10 | 10 | 10 | — | — | — | — | — |
| | I-907 | — | — | — | — | — | 10 | 10 | 10 | 10 | 10 |
| Component (C) (parts by mass) | Cyclopentadiene resin | 20 | 20 | 20 | 20 | 20 | 20 | 2 | 10 | 20 | 20 |
| Component (E) Polar organic solvent | IPA | 2 | — | 4 | 6 | 10 | 2 | 2 | 2 | 2 | 2 |
| Other components (parts by mass) | 2-HEMA | — | — | — | — | — | — | — | — | — | — |
| | MTEGMA | — | — | — | — | — | — | — | — | — | — |
| | Acryloyl morpholine | — | — | — | — | — | — | — | — | — | — |
| Polymerization inhibitor | MDP | 0.1 | 0.1 | 0.1 | 0.1 | 0.1 | 0.1 | 0.1 | 0.1 | 0.1 | 0.1 |
| Adhesive strength (MPa) | — | 10.2 | 14.5 | 11.3 | 8.6 | 5.4 | 15.1 | 12.2 | 13.6 | 15.6 | 15.4 |
| Removal time (min) | — | 15 | 20 | 8 | 5 | 1 | 10 | 13 | 12 | 30 | 43 |

Comparative Examples 2-1 to 2-5

Curable resin compositions were prepared in the same manner as in Example 2-1 except that raw materials of types as identified in Table 2-1 were used in compositions as identified in Table 2-1. The measurement of tensile shear bond strength and the removing test were carried out in the same manner as in Example 2-1, with respect to the obtained curable resin compositions. The results are shown in Table 2-2.

TABLE 2-2

| Ex. | — | 2-1 | 2-2 | 2-3 | 2-4 | 2-5 |
|---|---|---|---|---|---|---|
| Component (A) (parts by mass) | TE-2000 | — | — | — | — | — |
| | R-684 | — | — | — | — | — |
| Component (B) (parts by mass) | M-101A | — | — | — | — | — |
| | QM | — | — | — | — | — |
| | BZ | 40 | — | — | — | — |
| | M140 | — | — | — | — | — |
| | IBX | 60 | — | — | — | 30 |

TABLE 2-2-continued

| Ex. | — | 2-1 | 2-2 | 2-3 | 2-4 | 2-5 |
|---|---|---|---|---|---|---|
| Component (D) photo-polymerization initiator (parts by mass) | BDK | 5 | 1.5 | 1.5 | 2 | 2 |
| | I-907 | — | — | — | — | — |
| Component (C) (parts by mass) | Cyclo-pentadiene resin | | | | | |
| Component (E) Polar organic solvent | IPA | — | — | — | — | — |
| Other components (parts by mass) | 2-HEMA | — | — | — | — | 70 |
| | MTEGMA | — | 100 | — | 70 | — |
| | Acryloyl morpholine | — | — | 100 | 30 | — |
| Polymerization inhibitor | MDP | 0.1 | 0.1 | 0.1 | 0.1 | 0.1 |
| Adhesive strength (MPa) | — | 10.5 | 2 | 2 | 8.4 | 12.3 |
| Removal time (min) | — | Not removed | Dissolved | Adhesive residue | Dissolved | Not removed |

As a result, the protective films made of the curable resin compositions in Comparative Examples 2-1 and 2-5 were not removed from glass. Further, the protective films made of the curable resin compositions in Comparative Examples 2-2 and 2-4 were dissolved upon being brought into contact with warm water, whereby the removing test by sheets could not be carried out. Further, the protective film made of the curable resin composition in Comparative Example 2-3 remained in part after the removing test by a sheet (adhesive residue).

Examples 2-11 and 2-12

Using the curable resin compositions in Examples 2-1 and 2-5, test pieces for removing test were prepared in the same manner as in Example 2-1, and removing tests were carried out by changing the temperature of warm water to 40° C., 50° C., 60° C. and 70° C., respectively. The results are shown in Table 2-3.

TABLE 2-3

| Resin composition | | | Temperature of warm water (° C.) | | | |
|---|---|---|---|---|---|---|
| | No. | | 40 | 50 | 60 | 70 |
| Ex. 2-11 | Ex. 2-1 | Removal time (min) | 40 | 35 | 22 | 18 |
| Ex. 2-12 | Ex. 2-5 | Removal time (min) | 20 | 18 | 15 | 7 |

Example 2-13

Using the curable resin composition in Example 2-1, a test piece for removing test was prepared in the same manner as in Example 2-1. Then, using, as a sheet, a dicing tape (Elegrip, manufactured by Denki Kagaku Kogyo Kabushiki Kaisha) which is an adhesive curable with energy rays, the removing test was carried out in the same manner as in Example 2-1 after irradiation with ultraviolet rays. As a result, the curable resin composition in Example 2-1 is removed as combined with the dicing tape.

Comparative Example 2-6

Using the curable resin composition in Comparative Example 2-1, a test piece for removing test was prepared in the same manner as in Example 2-1. Then, using, as a sheet, a dicing tape (Elegrip, manufactured by Denki Kagaku Kogyo Kabushiki Kaisha) which is an adhesive curable with energy rays, the removing test was carried out in the same manner as in Example 2-1 after irradiation with ultraviolet rays. As a result, the curable resin composition in Comparative Example 2-1 was not removed.

Example 2-14

The curable resin composition in Example 2-1 was applied to a silicon wafer with a diameter of 6 inch, and cured in the same manner as in Example 2-1 to form a protective film. Then, the silicon wafer was fixed with a dicing tape on the protective film side, and cut in the size of 10 mm square by means of a dicing apparatus. On that occasion, no dropping of the silicon wafer occurred during cutting, and no infiltration of cutting water was observed, thus showing good processability. Then, ultraviolet rays were applied, and the cut test pieces were recovered. The protective film on every test specimen was combined with the dicing tape, and cut test pieces without the protective film could be recovered.

Comparative Example 2-7

The curable resin composition in Comparative Example 2-1 was applied to a silicon wafer with a diameter of 6 inch, and cured in the same manner as in Example 2-1 to form a protective film. Then, the wafer was cut into a 10 mm square by means of a dicing apparatus in the same manner as in Example 2-14. On that occasion, dropping of the silicon wafer occurred during cutting, and the protective film was dissolved, and infiltration of cutting water was confirmed. Then, ultraviolet rays were applied, and the cut test pieces were recovered. Adhesive residue of the protective film occurred on some of test pieces.

Example 3-1

80 Parts by mass of UC-203 as (F) a (meth)acrylate having at least one (meth)acryloyl group at the terminal or in the side chain of its molecule and having a molecular weight of at least 500, 20 parts by mass of QM as (G) a (meth)acrylate other than (F), 10 parts by mass of I-907 as (D) a photopolymerization initiator, 2 parts by mass of AEROSIL R972 which is a dry method silica as (H) an inorganic filler, and 0.1 part by mass of MDP as a polymerization inhibitor, were blended to prepare a curable resin composition for surface protection. Using the obtained curable resin composition for surface protection, the measurement of tensile shear bond strength and the removing test were carried out by the above evaluation methods. The results are shown in Table 3-1.

Example 3-2 to 3-19

Curable resin compositions for surface protection were prepared in the same manner as in Example 3-1 except that raw materials of types as identified in Tables 3-1 and 3-2 were used in compositions as identified in Tables 3-1 and 3-2. The measurement of tensile shear bond strength and the removing test were carried out in the same manner as in Example 3-1, with respect to the obtained curable resin compositions. The results are shown in Tables 3-1 and 3-2.

TABLE 3-1

| Ex. | — | 3-1 | 3-2 | 3-3 | 3-4 | 3-5 |
|---|---|---|---|---|---|---|
| Component (F) (parts by mass) | UC-203 | 80 | 60 | 90 | 80 | — |
|  | TE-2000 | — | — | — | — | 20 |
|  | UV7000B | — | — | — | — | — |
|  | UV3000B | — | — | — | — | — |
| Component (G) (parts by mass) | M-101A | — | — | — | — | 25 |
|  | QM | 20 | 40 | 10 | 20 | — |
|  | BZ | — | — | — | — | — |
|  | M140 | — | — | — | — | 40 |
|  | IBXA | — | — | — | — | — |
|  | IBX | — | — | — | — | — |
|  | R-684 | — | — | — | — | 15 |
| Component (D) photopolymerization initiator (parts by mass) | I-907 | 10 | 10 | 10 | 10 | 10 |
| Component (H) Inorganic filler (parts by mass) | Aerosil R-972 | 2 | 2 | 2 | — | 5 |
| Other components (parts by mass) | 2-HEMA | — | — | — | — | — |
|  | MTEGMA | — | — | — | — | — |
|  | ACMO | — | — | — | — | — |
| Cyclopentadiene resin | Quintone 1700 | — | — | — | — | 20 |
| Polar organic solvent | IPA | — | — | — | — | 10 |
| Polymerization inhibitor | MDP | 0.1 | 0.1 | 0.1 | 0.1 | 0.1 |
| Viscosity (mPa · s) | — | 10,500 | 5,020 | 52,000 | 5,700 | 1,000 |
| Surface curing property | — | ○ | ○ | ○ | ○ | ○ |
| Removability (1) (min) | — | 5 | 6 | 4 | 5 | 9 |
| Removability (2) (min) | — | 1 | 1 | 1 | 1 | Not removed |

| Ex. | — | 3-6 | 3-7 | 3-8 | 3-9 | 3-10 |
|---|---|---|---|---|---|---|
| Component (F) (parts by mass) | UC-203 | — | — | — | — | — |
|  | TE-2000 | 20 | — | — | — | — |
|  | UV7000B | — | 20 | 20 | 20 | — |
|  | UV3000B | — | — | — | — | 20 |
| Component (G) (parts by mass) | M-101A | 25 | 25 | 25 | 25 | 25 |
|  | QM | — | — | — | — | — |
|  | BZ | — | — | — | — | — |
|  | M140 | 40 | 40 | 40 | 40 | 40 |
|  | IBXA | — | — | — | — | — |
|  | IBX | — | — | — | — | — |
|  | R-684 | 15 | 15 | 15 | 15 | 15 |
| Component (D) photopolymerization initiator (parts by mass) | I-907 | 10 | 10 | 10 | 10 | 10 |
| Component (H) Inorganic filler (parts by mass) | Aerosil R-972 | 8 | 5 | 8 | 5 | 8 |
| Other components (parts by mass) | 2-HEMA | — | — | — | — | — |
|  | MTEGMA | — | — | — | — | — |
|  | ACMO | — | — | — | — | — |
| Cyclopentadiene resin | Quintone 1700 | 20 | 20 | 20 | 20 | — |
| Polar organic solvent | IPA | 10 | 10 | 10 | 20 | 10 |
| Polymerization inhibitor | MDP | 0.1 | 0.1 | 0.1 | 0.1 | 0.1 |
| Viscosity (mPa · s) | — | 2,300 | 5,000 | 18,000 | 3,800 | 6,200 |
| Surface curing property | — | ○ | ○ | ○ | ○ | ○ |
| Removability (1) (min) | — | 10 | 8 | 7 | 6 | 7 |
| Removability (2) (min) | — | Not removed | Not removed | Not removed | Not removed | Not removed |

TABLE 3-2

| Ex. | — | 3-11 | 3-12 | 3-13 | 3-14 | 3-15 |
|---|---|---|---|---|---|---|
| Component (F) (parts by mass) | UC-203 | 75 | 75 | 75 | 75 | 75 |
| | TE-2000 | — | — | — | — | — |
| | UV7000B | — | — | — | — | — |
| | UV3000B | — | — | — | — | — |
| Component (G) (parts by mass) | M-101A | — | — | — | — | — |
| | QM | — | — | — | — | — |
| | BZ | — | — | — | — | — |
| | M140 | — | — | — | — | — |
| | IBXA | 25 | 25 | 25 | — | 25 |
| | IBX | — | — | — | — | — |
| | R-684 | — | — | — | 25 | — |
| Component (D) photopolymerization initiator (parts by mass) | I-907 | 5 | 5 | 5 | 5 | 5 |
| Component (H) Inorganic filler (parts by mass) | Aerosil R-972 | — | 2 | 5 | — | — |
| Other components (parts by mass) | 2-HEMA | — | — | — | — | — |
| | MTEGMA | — | — | — | — | — |
| | ACMO | — | — | 1 | — | 1 |
| Cyclopentadiene resin | Quintone 1700 | — | — | — | — | — |
| Polar organic solvent | IPA | — | — | — | — | — |
| Polymerization inhibitor | MDP | 0.1 | 0.1 | 0.1 | 0.1 | 0.1 |
| Viscosity (mPa·s) | — | — | 4,080 | 7,200 | 11,300 | 8,600 | 3,900 |
| Surface curing property | — | — | ○ | ○ | ○ | ○ | ○ |
| Removability (1) (min) | — | — | 3 | 5 | 7 | 13 | 10 |
| Removability (2) (min) | — | — | 1 | 1 | 1 | 7 | 6 |

| Ex. | — | 3-16 | 3-17 | 3-18 | 3-19 |
|---|---|---|---|---|---|
| Component (F) (parts by mass) | UC-203 | 75 | 75 | 75 | 75 |
| | TE-2000 | — | — | — | — |
| | UV7000B | — | — | — | — |
| | UV3000B | — | — | — | — |
| Component (G) (parts by mass) | M-101A | — | — | — | — |
| | QM | — | — | — | — |
| | BZ | — | — | — | — |
| | M140 | — | — | — | — |
| | IBXA | 25 | 25 | 25 | 25 |
| | IBX | — | — | — | — |
| | R-684 | — | — | — | — |
| Component (D) photopolymerization initiator (parts by mass) | I-907 | 5 | 5 | 5 | 5 |
| Component (H) Inorganic filler (parts by mass) | Aerosil R-972 | — | — | 2 | 5 |
| Other components (parts by mass) | 2-HEMA | — | — | — | — |
| | MTEGMA | — | — | — | — |
| | ACMO | 3 | 5 | 3 | 3 |
| Cyclopentadiene resin | Quintone 1700 | — | — | — | — |
| Polar organic solvent | IPA | — | — | — | — |
| Polymerization inhibitor | MDP | 0.1 | 0.1 | 0.1 | 0.1 |
| Viscosity (mPa·s) | — | 2,800 | 1,600 | 8,200 | 15,600 |
| Surface curing property | — | ○ | ○ | ○ | ○ |
| Removability (1) (min) | — | 3 | 19 | 5 | 8 |
| Removability (2) (min) | — | 1 | 20 | 2 | 5 |

Comparative Examples 3-1 to 3-5

Curable resin compositions were prepared in the same manner as in Example 3-1 except that raw materials of types as identified in Table 3-3 were used in compositions as identified in Table 3-1. The measurement of viscosity was carried out in the same manner as in Example 3-1, with respect to the obtained curable resin compositions.

It was attempted to prepare test pieces for measurement of the surface curing property and for the removing test in the same manner as in Example 3-1 by screen printing. However, in each of Comparative Examples 3-1 to 3-5, the viscosity was low, and screen printing could not be conducted. Thus, the curable resin composition was applied to heat resistant Pyrex (registered trademark) glass or polycarbonate as the adherend by brush coating, and measurement of the surface curing property and the removing test were carried out. The results are shown in Table 3-3.

TABLE 3-3

| Comp. Ex. | | 3-1 | 3-2 | 3-3 | 3-4 | 3-5 |
|---|---|---|---|---|---|---|
| Component (F) (parts by mass) | UC-203 | — | — | — | — | — |
| | TE-2000 | — | — | — | — | — |
| | UV7000B | — | — | — | — | — |
| | UV3000B | — | — | — | — | — |
| Component (G) (parts by mass) | M-101A | — | — | — | — | — |
| | QM | — | — | — | — | — |
| | BZ | 40 | — | — | — | — |
| | M140 | — | — | — | — | — |
| | IBXA | — | — | — | — | — |
| | IBX | 60 | — | — | — | 30 |
| | R-684 | — | — | — | — | — |
| Component (D) photopolymerization initiator (parts by mass) | I-907 | 5 | 1.5 | 1.5 | 2 | 2 |
| Component (H) Inorganic filler (parts by mass) | Aerosil R-972 | — | — | — | — | — |
| Other components (parts by mass) | 2-HEMA | — | — | — | — | 70 |
| | MTEGMA | — | 100 | — | 70 | — |
| | ACMO | — | — | 100 | 30 | — |
| Cyclopentadiene resin | Quintone 1700 | — | — | — | — | — |
| Polar organic solvent | IPA | — | — | — | — | — |
| Polymerization inhibitor | MDP | 0.1 | 0.1 | 0.1 | 0.1 | 0.1 |
| Viscosity (mPa·s) | — | 30 | 5 | 15 | 10 | 17 |
| Surface curing property | — | X | X | ○ | Δ | X |
| Removability (1) (min) | — | Not removed | Dissolved | Adhesive residue | Dissolved | Not removed |
| Removability (2) (min) | — | Not removed | Dissolved | Adhesive residue | Dissolved | Not removed |

As a result, with each of the curable resin compositions for surface protection in Examples 3-1 to 3-19, screen printing was possible, the surface curing property was secured, and the obtained protective film was in the film form and easily removed.

Each of the protective films made of the curable resin compositions in Comparative Examples 3-1 and 3-5 was not removed from either adherends of glass and polycarbonate.

Further, each of the protective films made of the curable resin compositions in Comparative Examples 3-2 and 3-4 was dissolved upon being brought into contact with warm water. Further, the protective film made of the curable resin composition in Comparative Example 3-3 remained in part after the removing test (adhesive residue).

INDUSTRIAL APPLICABILITY

The resin composition of the present invention has a photocurable property, and a cured product thereof shows a high adhesive strength without being influenced by e.g. cutting water, and thus little displacement will occur during processing of a member to be processed and a processed member excellent in dimensional accuracy will readily be obtained. Furthermore, it loses the adhesive strength when contacted with warm water, whereby a member can be readily recovered. Therefore, it is useful as an adhesive for temporary fixation of optical lenses, prisms, arrays, silicon wafers, semiconductor packing parts, etc.

The present invention further provides an industrially useful, simple and environmentally excellent removing method without adhesive residue, which removes, from a member to be processed, a protective film to protect an already processed surface or a functional portion such as a circuit or a center portion of the member to be processed from infiltration of cutting water or from scars or contamination by e.g. cutting wastes, in processing, particularly precision processing such as cutting, grinding or polishing, of optical components or electric or electronic components such as sensors. Still further, the present invention is useful as a protective film to prevent contamination by e.g. a plating liquid to be used for a circuit board such as a printed wiring board, and for masking at the time of painting or printing of various tablets such as nameplates or logos, scales on measuring instruments and decorations applied to various industrial products, in addition to electric or electronic components.

The entire disclosures of Japanese Patent Application No. 2006-005597 filed on Jan. 13, 2006, Japanese Patent Application No. 2006-248859 filed on Sep. 14, 2006 and Japanese Patent Application No. 2006-281257 filed on Oct. 16, 2006 including specifications, claims and summaries are incorporated herein by reference in their entireties.

The invention claimed is:

1. A curable resin composition for surface protection, comprising (C) a resin having a cyclopentadiene skeleton, (F) a (meth)acrylate having at least one (meth)acryloyl group at the terminal or in the side chain of its molecule and having a molecular weight of at least 500, (G) a (meth)acrylate other than (F), (D) a photopolymerization initiator, and (E) an alcohol having a boiling point of from 50° C. to 130° C. which comprises from 20 to 90 parts by mass of (F), from 10 to 80 parts by mass of (G), and from 0.1 to 20 parts by mass of (D),
wherein (F) comprises at least one member selected from the group consisting of 1,2-polybutadiene-terminated urethane (meth)acrylate and polyester urethane (meth)acrylate, and
wherein (G) comprises at least one member selected from the group consisting of 2-(1,2-cyclohexacaboxyimide) ethyl acrylate and dicyclopentanyl diacrylate.

2. A member to be processed, comprising a cured product of the curable resin composition for surface protection, as defined in claim 1 provided on its surface.

3. The curable resin composition of claim 1, wherein (E) is isopropanol.

4. The curable resin composition of claim 1, wherein (E) is methanol, ethanol, n-propanol, n-butanol, isobutanol, secondary butanol, tertiary butanol, n-amyl alcohol, isoamyl alcohol or 2-ethyl butyl alcohol.

5. The curable resin composition of claim 1, wherein (E) is methanol, ethanol, n-propanol, isopropanol, n-butanol, isobutanol, secondary butanol or tertiary butanol.

6. The curable resin composition of claim 1, wherein the resin having a cyclopentadiene skeleton has a softening point of from 50° C. to 200° C.

7. The curable resin composition of claim 1, wherein the resin having a cyclopentadiene skeleton has a number average molecular weight of from 300 to 600.

8. A method of protecting a surface, comprising applying the composition of claim 1 to a surface.

9. The method of claim 8, further comprising curing the composition on the surface.

10. The curable resin composition of claim 1, wherein (F) is 1,2-polybutadiene-terminated urethane (meth)acrylate.

11. The curable resin composition of claim 1, wherein (F) is polyester urethane (meth)acrylate.

12. The curable resin composition of claim 1, wherein (G) is 2-(1,2-cyclohexacaboxyimide)ethyl acrylate.

13. The curable resin composition of claim 1, wherein (G) is dicyclopentanyl diacrylate.

14. The curable resin composition of claim 1, wherein (F) is 1,2-polybutadiene-terminated urethane (meth)acrylate and (G) is dicyclopentanyl diacrylate.

* * * * *